United States Patent
Berg

(10) Patent No.: US 12,355,684 B2
(45) Date of Patent: Jul. 8, 2025

(54) DIGITAL RADIO COMMUNICATIONS

(71) Applicant: Nordic Semiconductor ASA, Trondheim (NO)

(72) Inventor: Heikki Berg, Oulu (FI)

(73) Assignee: Nordic Semiconductor ASA, Trondheim (NO)

( * ) Notice: Subject to any disclaimer, the term of this patent is extended or adjusted under 35 U.S.C. 154(b) by 441 days.

(21) Appl. No.: 17/924,968

(22) PCT Filed: May 11, 2021

(86) PCT No.: PCT/EP2021/062463
§ 371 (c)(1),
(2) Date: Nov. 11, 2022

(87) PCT Pub. No.: WO2021/228844
PCT Pub. Date: Nov. 18, 2021

(65) Prior Publication Data
US 2023/0198691 A1    Jun. 22, 2023

(30) Foreign Application Priority Data

May 11, 2020  (GB) ................................... 2006915
Jun. 11, 2020  (GB) ................................... 2008893

(51) Int. Cl.
*H04L 5/00* (2006.01)
*H04L 27/26* (2006.01)

(52) U.S. Cl.
CPC ............ *H04L 5/001* (2013.01); *H04L 5/0023* (2013.01); *H04L 5/0051* (2013.01);
(Continued)

(58) Field of Classification Search
None
See application file for complete search history.

(56) References Cited

U.S. PATENT DOCUMENTS

2013/0064196 A1    3/2013  Gao et al.
2014/0355559 A1*  12/2014  Gao ..................... H04L 5/0005
                                                                    370/330

(Continued)

OTHER PUBLICATIONS

IPO Search Report under Section 17(5) for GB2006915.9, mailed Mar. 12, 2021, 4 pages.

(Continued)

*Primary Examiner* — Faruk Hamza
*Assistant Examiner* — Cassandra L Decker
(74) *Attorney, Agent, or Firm* — Klarquist Sparkman, LLP

(57) ABSTRACT

An Orthogonal Frequency-Division Multiplexing digital radio transmitter is arranged to transmit a data packet comprising a plurality of Orthogonal Frequency-Division Multiplexing symbols. At least one of the symbols comprises a plurality of demodulation reference signals in a first plurality of frequency sub-carriers of the symbol. The transmitter is arranged to transmit a physical control channel at least partly distributed among a remainder of frequency sub-carriers of the symbol according to a calculated distribution. The transmitter calculates the distribution by arranging the remainder of frequency sub-carriers in a two-dimensional matrix such that said remainder of frequency sub-carriers have indices which are sequential in a first dimension and have a common increment in a second dimension, and allocating a second plurality of the remainder of frequency sub-carriers to the physical control channel sequentially in the second direction.

12 Claims, 11 Drawing Sheets

(52) U.S. Cl.
CPC .......... *H04L 5/0053* (2013.01); *H04L 5/0094* (2013.01); *H04L 27/2613* (2013.01)

(56) References Cited

U.S. PATENT DOCUMENTS

2016/0254889 A1* 9/2016 Shattil .................. H04L 5/0035
370/329
2021/0336662 A1* 10/2021 Huang .................. H04L 5/0012

OTHER PUBLICATIONS

International Search Report and Written Opinion for PCT/EP2021/062463, mailed Aug. 5, 2021, 19 pages.
Vivo: "NR PDCCH structure", 3GPP Draft; R1-1716673_NR_PDCCH Structure, 3rd Generation Partnership Project (3GPP), Mobile Competence Centre ; 650, Route Des Lucioles; F-06921 Sophia-Antipolis Cedex; France; vol. RAN WG1, No. Nagoya, Japan; Sep. 18, 2017-Sep. 21, 2017, Sep. 18, 2017 (Sep. 18, 2017), XP051353800, Retrieved from the Internet: URL: http://www.3gpp.org/ftp/tsg_ran/WG1_RL1/TSGR1_AH/NR_AH_1709/Docs/, [retrieved on—Sep. 18, 2017], Sect. 2.
NTT Docomo et al: "Remaining issues of resource mapping for NR-PDCCH", 3GPP Draft; R1-1713928, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 20, 2017 (Aug. 20, 2017), XP051316720, Retrieved from the Internet: URL: http://www.3gpp.org/ftp/Meetings_3GPP_SYNC/RAN1/Docs/, [retrieved on Aug. 20, 2017], Sect. 2.2.
Sassan Ahmadi: "The IEEE 802.16m Physical Layer (Part I)", In: "Mobile WiMAX", Jan. 1, 2011 (Jan. 1, 2011), Elsevier, XP055249201, ISBN: 978-0-12-374964-2, pp. 335-487, DOI: 10.1016/B978-0-12-374964-2.10009-8, Sect. 2.8.

* cited by examiner

DIGITAL RADIO COMMUNICATIONS

CROSS REFERENCE TO RELATED APPLICATIONS

This is the U.S. National Stage of International Application No. PCT/EP2021/062463, filed May 11, 2021, which was published in English under PCT Article 21(2), which in turn claims the benefit of Great Britain Application No. 2008893.6, filed Jun. 11, 2020, and Great Britain Application No. 2006915.9, filed May 11, 2020.

FIELD

This invention relates to low power digital radio communications. It relates more specifically, although not exclusively, to the allocation of frequency subcarriers to different parts of a data packet in an Orthogonal Frequency-Division Multiplexing (OFDM) radio system supporting Multiple-Input-Multiple-Output (MIMO) transmission modes.

BACKGROUND

OFDM is a form of radio transmission that is used in various radio protocols such as Long Term Evolution (LTE), various IEEE 802.11 standards, DAB radio, DVB-T, and WiMAX. Rather than encoding data on a single carrier frequency, a data stream is spread over some or all of a radio channel containing multiple OFDM subcarriers. The OFDM subcarriers are typically closely spaced, at regular intervals, across the frequency spectrum, although this is not essential. The subcarriers are orthogonal to avoid mutual interference. OFDM can thereby provide good resilience to multipath fading and to external interference.

In some radio communication applications, the MIMO principle is employed whereby the transmitter and receiver are provided with multiple antennas which can be exploited in a number of ways. MIMO communications are dependent on the fact that transmission antennas are 'separated' between each other and receiver antennas also separated between each other. This separation enables frequency selectivity between transmission paths to be independent. Separation can be either physical (distance) or polarisation diversity (two antennas are orthogonally polarized) or combination thereof.

Radio systems that support MIMO modes of operation often support a plurality of different MIMO modes using different numbers of transmit antennas, including spatial multiplexing, space-time transmit diversity, space-time block encoding, open-loop beamforming and closed-loop beamforming. When operating with different MIMO modes and/or different numbers of transmit antennas, the OFDM frequency subcarrier allocations for transmission of different parts of a data packet may differ. A transmitter and receiver are therefore required to be able to determine which subcarrier allocation to use in order for a data packet to be successfully encoded, transmitted, received and decoded.

SUMMARY

When viewed from a first aspect the present invention provides an Orthogonal Frequency-Division Multiplexing (OFDM) digital radio transmitter arranged to transmit a data packet comprising a plurality of OFDM symbols, at least one of said symbols comprising a plurality of demodulation reference signals (DRS) in a first plurality of frequency sub-carriers of said symbol, the transmitter further being arranged to transmit a physical control channel (PCC) at least partly distributed among a remainder of frequency sub-carriers of said symbol according to a calculated distribution wherein the transmitter is arranged to calculate said distribution by:
  arranging said remainder of frequency sub-carriers in a two-dimensional matrix such that said remainder of frequency sub-carriers have indices which are sequential in a first dimension and have a common increment in a second dimension; and
  allocating a second plurality of said remainder of frequency sub-carriers to said PCC sequentially in said second direction.

The invention extends to an Orthogonal Frequency-Division Multiplexing (OFDM) digital radio receiver arranged to receive a data packet comprising a plurality of OFDM symbols, at least one of said symbols comprising a plurality of demodulation reference signals (DRS) in a first plurality of frequency sub-carriers of said symbol, the receiver further being arranged to decode a physical control channel (PCC) at least partly distributed among a remainder of frequency sub-carriers of said symbol according to a calculated distribution wherein the receiver is arranged to calculate said distribution by:
  arranging said remainder of frequency sub-carriers in a two-dimensional matrix such that said remainder of frequency sub-carriers have indices which are sequential in a first dimension and have a common increment in a second dimension; and
  allocating a second plurality of said remainder of frequency sub-carriers to said PCC sequentially in said second direction.

The invention also extends to a non-transitory computer readable medium comprising instructions configured to cause a digital radio transmitter to transmit a data packet comprising a plurality of OFDM symbols, at least one of said symbols comprising a plurality of demodulation reference signals (DRS) in a first plurality of frequency sub-carriers of said symbol, the instructions further being configured to cause the transmitter to transmit a physical control channel (PCC) at least partly distributed among a remainder of frequency sub-carriers of said symbol according to a calculated distribution wherein the instructions are configured to cause the transmitter to calculate said distribution by:
  arranging said remainder of frequency sub-carriers in a two-dimensional matrix such that said remainder of frequency sub-carriers have indices which are sequential in a first dimension and have a common increment in a second dimension; and
  allocating a second plurality of said remainder of frequency sub-carriers to said PCC sequentially in said second direction.

The invention also extends to a non-transitory computer readable medium comprising instructions configured to cause a digital radio receiver to receive a data packet comprising a plurality of OFDM symbols, at least one of said symbols comprising a plurality of demodulation reference signals (DRS) in a first plurality of frequency sub-carriers of said symbol, the instructions further being configured to cause the receiver to decode a physical control channel (PCC) at least partly distributed among a remainder of frequency sub-carriers of said symbol according to a calculated distribution wherein the instructions are configured to cause the receiver to calculate said distribution by:
  arranging said remainder of frequency sub-carriers in a two-dimensional matrix such that said remainder of frequency sub-carriers have indices which are sequential in a first dimension and have a common increment in a second dimension; and allocating a second plurality of said remainder of frequency sub-carriers to said PCC sequentially in said second direction.

The Applicant has found that by the transmitter calculating frequency sub-carrier allocations for the PCC in accordance with the invention, an optimum or near-optimum spread across the available sub-carriers may be achieved which may allow for maximal diversity from frequency selectivity compared to, say, simply allocating the sub-carriers sequentially. This may help to avoid adverse consequences from narrowband interference sources.

The first direction may be the rows of the matrix and the second directions the columns. Thus for example the frequency sub-carrier indices may be sequential along each row and the allocation of frequency sub-carriers taken sequentially along one or more columns, preferably in turn. However those skilled in the art will appreciate that the designation of 'row' and 'column' for the matrix is arbitrary and that they can be interchanged. Indeed it will also be appreciated that the sequences referred to herein could go in either direction.

As will be appreciated, the DRS allow the receiver to perform channel estimation.

Such an approach to allocating sub-carrier frequencies to a PCC is considered to be novel and inventive in its own right and thus when viewed from a second aspect the invention provides a method of allocating a physical control channel (PCC) to frequency sub-carriers of an Orthogonal Frequency-Division Multiplexing (OFDM) symbol in an OFDM digital radio transmission system, the method comprising:

determining a first plurality of said frequency sub-carriers allocated to demodulation reference signals (DRS);

determining a remainder of said frequency sub-carriers of said symbol:

arranging said remainder of frequency sub-carriers in a two-dimensional matrix such that said remainder of frequency sub-carriers have indices which are sequential in a first dimension and have a common increment in a second dimension;

allocating a second plurality of said remainder of frequency sub-carriers to said PCC sequentially in said second direction; and recording said allocation of frequency sub-carriers to said PCC.

In a set of embodiments the frequency sub-carrier indices are also ordered in the second direction. For example the indices may run sequentially along each row (column) and each new row (column) continue from the end of the last so that there is the same increment between respective elements in each column (row) as well as each element in a row (column) having the common increment to the corresponding element in the next row (column). This may help to ensure optimum distribution when the allocations are read along the columns (rows) in turn, in accordance with the invention.

In a set of embodiments the transmitter or receiver is arranged to determine a total number of frequency sub-carriers required to transmit said PCC, calculate a first number of remainder frequency sub-carriers in a first symbol, compare said total number to said first number and carry out said calculation of the distribution only if said total number is less than said first number. If the transmitter determines that said total number is greater than or equal to said first number, the transmitter may allocate all of said first remainder frequency sub-carriers to PCC, subtract said first number from said total number to produce an outstanding number of frequency sub-carriers required to transmit said PCC and compare said outstanding number to a second number of remainder frequency sub-carriers in a second symbol. Such a process may be repeated until the outstanding number of frequency sub-carriers is less than a number of remainder frequency sub-carriers in a symbol whereafter the transmitter may carry out said calculation of the distribution. Thus as a preceding step the transmitter is arranged to iterate through preferably consecutive symbols, allocating all available frequency subcarriers of each symbol to the PCC if that symbol does not comprise enough available subcarriers to allocate the remaining unallocated parts of the PCC fully. It will be appreciated that the receiver set out herein may comprise the same features.

In a set of embodiments, the size of the matrix in the second dimension—e.g. the number of rows—is equal to the highest common factor of the maximum number of frequency subcarriers which are available in a single OFDM symbol (e.g. omitting subcarriers excluded in order to provide a guard band) and the number of individual frequency subcarriers required for the PCC. It follows that the size of the matrix in the first dimension is preferably equal to the number of remainder frequency sub-carriers divided by the size of the matrix in the first dimension. In an exemplary set of embodiments the maximum number of frequency sub-carriers which are available in a single OFDM symbol (dictated by the size of the Fast Fourier Transform module employed) is 56 and the number of individual frequency subcarriers required for the PCC is 98 and therefore the size of the matrix in the second dimension—e.g. the number of rows—is equal to 14 being the highest common factor of 56 and 98.

In another set of embodiments, the size of the matrix in the second dimension—e.g. the number of rows—is equal to a common factor of the maximum number of frequency subcarriers which are available in a single OFDM symbol (e.g. omitting subcarriers excluded in order to provide a guard band) and the number of individual frequency sub-carriers required for the PCC, wherein the common factor is preferably chosen such that each group of subcarriers with adjacent frequencies allocated to the PCC comprises an even number of subcarriers. By choosing the common factor in this way, in certain embodiments wherein multiple transmit antennas are used, the PCC may be transmitted using a transmit diversity scheme, for example Alamouti transmit diversity. It may be beneficial that the radio channel response for two subcarriers used for such transmit diversity be as similar as possible, and as radio channel response is dependent on frequency it follows that pairs of subcarriers used for transmit diversity are preferably of adjacent frequencies. Hence, groups of subcarriers with adjacent frequencies allocated to the PCC are preferably of even size.

It again follows that the size of the matrix in the first dimension is preferably equal to the number of remainder frequency sub-carriers divided by the size of the matrix in the first dimension. In an exemplary set of the embodiments set out above the maximum number of frequency subcarriers which are available in a single OFDM symbol (dictated by the size of the Fast Fourier Transform module employed) is 56 and the number of individual frequency subcarriers required for the PCC is 98 and the size of the matrix in the second dimension—e.g. the number of rows—is equal to the common factor 7 of 56 and 98, whereby symbols in which not all available subcarriers are allocated to the PCC comprise 7 groups of even numbers (e.g. pairs) of adjacent frequencies.

In a set of embodiments, the size of the matrix in the second dimension—e.g. the number of rows—is equal to an even division (e.g. half) of the highest common factor of the maximum number of frequency subcarriers which are available in a single OFDM symbol (e.g. omitting subcarriers excluded in order to provide a guard band) and the number of individual frequency subcarriers required for the PCC, if the highest common factor is even. In an exemplary set of these embodiments the maximum number of frequency subcarriers which are available in a single OFDM symbol (dictated by the size of the Fast Fourier Transform module employed) is 56 and the number of individual frequency subcarriers required for the PCC is 98 and therefore the size of the matrix in the second dimension—e.g. the number of rows—is equal to 7 being the highest common factor of 56 and 98 (i.e. 14) divided by two.

The Applicant has further appreciated that having the transmitter and receiver applying a common algorithm to determine the allocation of sub-carriers to PCC is particularly advantageous as it allows the transmission to accommodate changes in the available sub-carriers without having to store and maintain lookup tables in all devices. For example the available sub-carriers will typically change as a result of a change in MIMO transmission mode which changes the allocation of sub-carriers to DRS, or even as a result of changes to the communication protocol e.g. to accommodate different numbers of effective antennas. As used herein, the term 'effective antenna' is used to refer to a single antenna as seen from the point of view of a receiver. For example, if multiple different antennas are used to beamform a transmitted signal (by changing magnitudes and phases of signal transmitted from each antenna), although multiple physical antennas are in use, the number of effective antennas is one as the receiver is unable to differentiate between the signals transmitted by the individual antennas.

It has been appreciated by the Applicant that the principle of having a common algorithm from which a PCC allocation can be generated in the transmitter and receiver rather than needing to calculate, distribute and store values in all equipment is novel and inventive in its own right and thus when viewed from a third aspect the present invention provides a method of operating an OFDM digital radio communication system comprising a transmitter and a receiver according to a predetermined communication protocol, the method comprising:

using a predetermined algorithm to calculate a distribution of frequency sub-carriers for transmitting a PCC;

the transmitter transmitting a data packet comprising a plurality of OFDM symbols, at least one of said symbols comprising a plurality of DRS in a first plurality of frequency sub-carriers of said symbol, the transmitter further being arranged to transmit said physical control channel according to said distribution of frequency sub-carriers;

the receiver receiving said packet, using said predetermined algorithm to determine said distribution of frequency sub-carriers for the PCC and using said distribution of frequency sub-carriers to decode said packet.

In a set of embodiments, the transmitter is further arranged to transmit a Physical Data Channel (PDC) distributed among a remainder of subcarriers not allocated to the DRS or PCC, wherein the PCC comprises information required to decode the PDC.

The transmitter may be arranged to transmit the data packet using a plurality of antennas. The transmitter may consequently be arranged to encode at least part of the data packet using at least one of spatial multiplexing, space-time transmit diversity and space-time block encoding Multiple-Input-Multiple-Output (MIMO) modes. The transmitter may further be arranged to perform beamforming on at least part of the data packet. In a set of embodiments, the transmitter is arranged to transmit a plurality of sets of DRS, wherein one set of DRS is transmitted for each effective antenna in use by the transmitter.

In a set of embodiments, the transmitter is arranged to transmit a Synchronisation Training Field (STF) distributed among a plurality of subcarriers in at least one OFDM symbol preceding the symbol comprising the plurality of frequency subcarriers allocated to the DRS.

BRIEF DESCRIPTION OF THE DRAWINGS

Certain embodiments of the invention will now be described, by way of example only, with reference to the accompanying drawings in which.

DETAILED DESCRIPTION OF THE DRAWINGS

Figure 1:
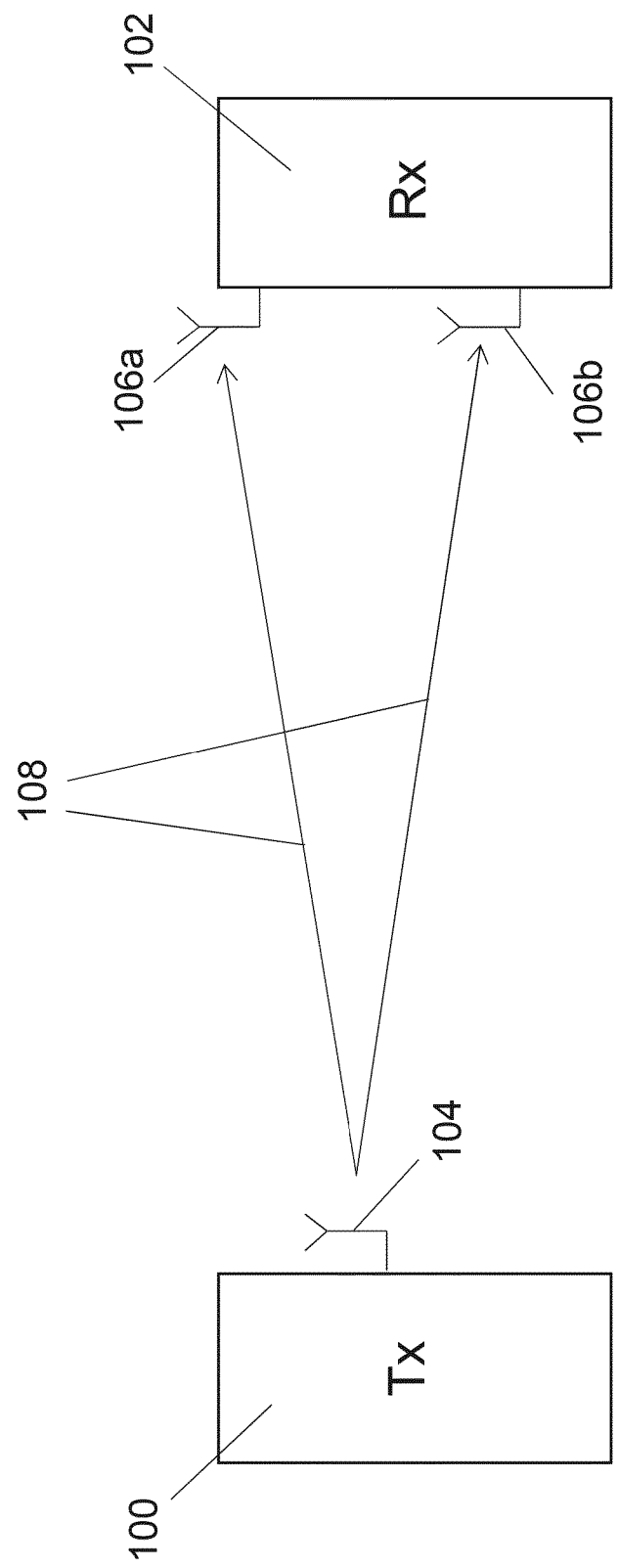
FIG. 1 is a schematic diagram illustrating a first radio communication system in accordance with the invention.

FIG. 1 shows a first radio communication system comprising a first digital radio transceiver device 100 and a second digital radio transceiver device 102. The first radio transceiver device comprises one antenna 104 and the second radio transceiver device comprises two antennas 106a and 106b. As will be well understood by those skilled in the art, a number of standard modules such as processors, oscillators, filters, amplifiers, digital to analogue converters and analogue to digital converters are provided in the radio transceivers 100, 102 but description of these is omitted for the sake of brevity.

FIG. 1 also shows the possible signal paths 108 from the first transceiver 100 when it is acting as a transmitter through its antenna 104 to the second transceiver 102 acting as a receiver through each of its antennas 106a, 106b. As will be understood by those skilled in the art, the transmitter 100 may comprise more than one antenna, but simply be operating using only the single antenna 104. It will also be understood that the transmitter 100 may comprise more than one antenna but utilise a multi-antenna transmission mode—e.g. beamforming—such that multiple antennas are used to function as the single effective antenna 104. The transceivers are configured to operate using OFDM modulation as is known per se in the art.

Figure 2:
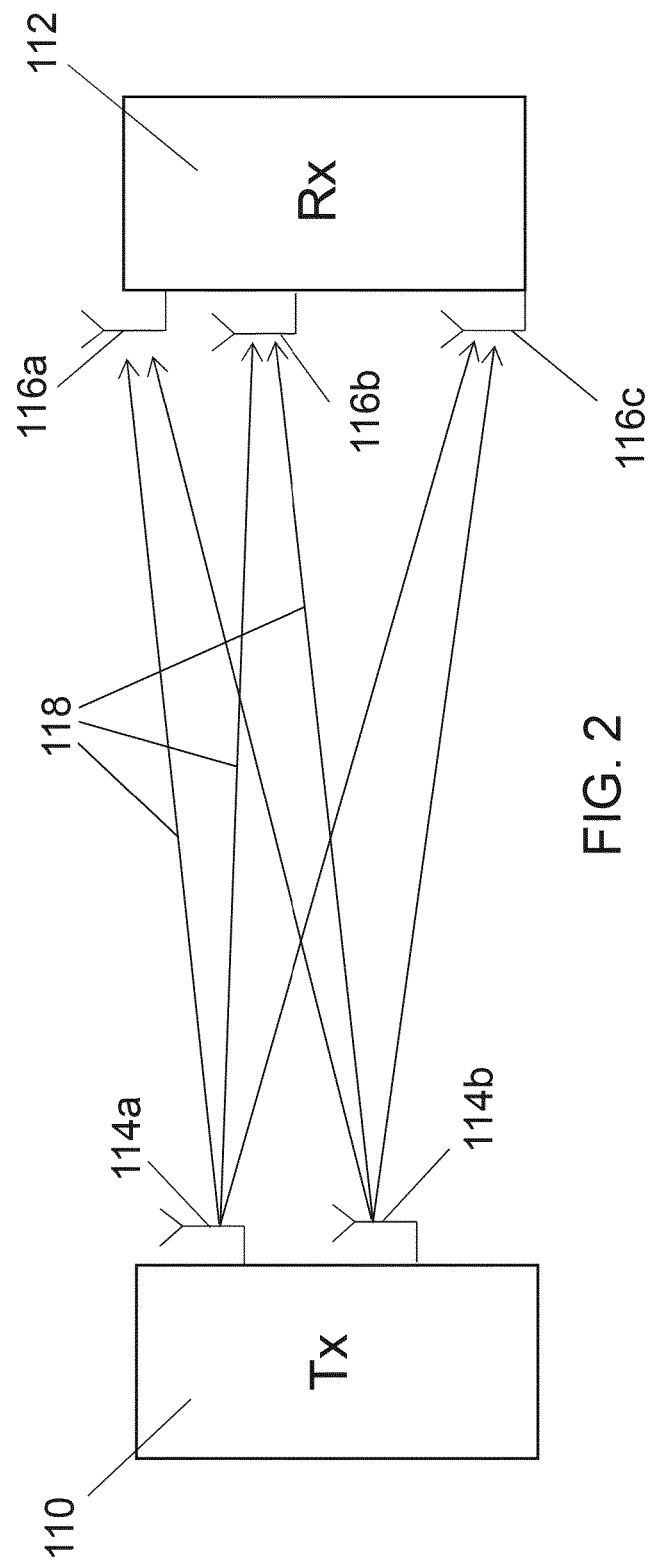
FIG. 2 is a schematic diagram illustrating a second radio communication system in accordance with the invention.

FIG. 2 shows a second similar radio communication system comprising a first digital radio transceiver device 110 and a second digital radio transceiver device 112. However in this case the first device 110 comprises two antennas or effective antennas 114a and 114b and the second device comprises three antennas or effective antennas 116a, 116b and 116c.

FIG. 2 also shows the possible signal paths 118 from the first transceiver 110 when it is acting as a transmitter through its antennas 114a, 114b to the second transceiver 112 acting as a receiver through each of its antennas 116a, 116b, 116c.

Figure 3:
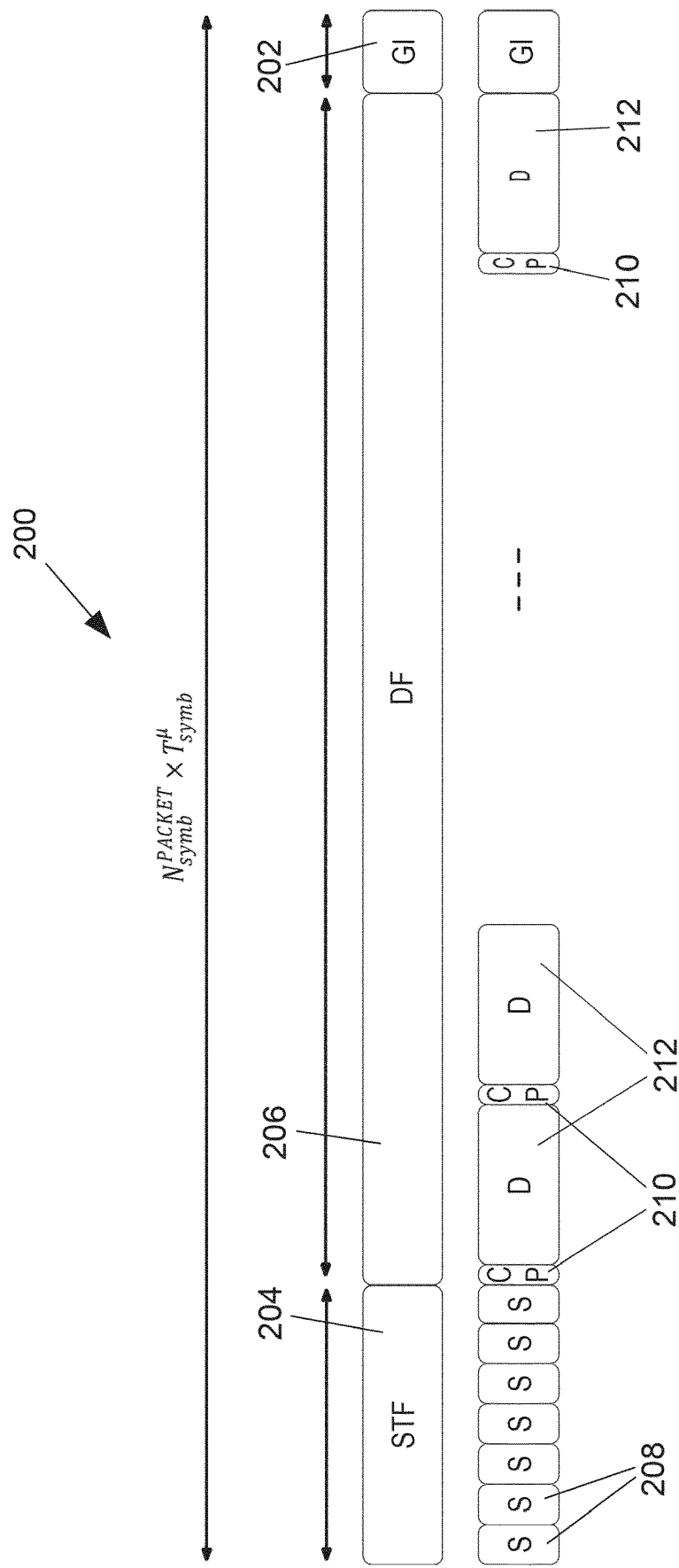
FIG. 3 is a schematic diagram of a first data packet structure in accordance with the invention.

FIG. 3 shows an example structure of a data packet 200 in accordance with the invention. The data packet comprises: a Synchronisation Training Field (STF) 204, a Data Field (DF) 206 and a Guard Interval (GI) 202. The lower part of the diagram shows various of these fields in more detail.

The STF 204 forms the initial part of the packet 200, comprising seven repetitions of a signal pattern 208, with the purpose of enabling synchronisation between the transmitter 100, 110 and the receiver 102, 112 by allowing the receiver 102, 112 to correct for receiver gain, frequency and timing errors relative to the transmitter 100, 110.

Following the STF 204 is the DF 206, comprising a number of data field symbols 212 each preceded by a cyclic prefix 210, with the purpose of delivering the payload of the packet 200. The DF 206 is transmitted using OFDM, providing the ability to dedicate different subcarrier frequencies for different signals/channels, as will be explained in more detail below with reference to FIG. 5.

Following the DF 206 is the GI 202, providing separation between consecutive packets 200.

Figure 4:
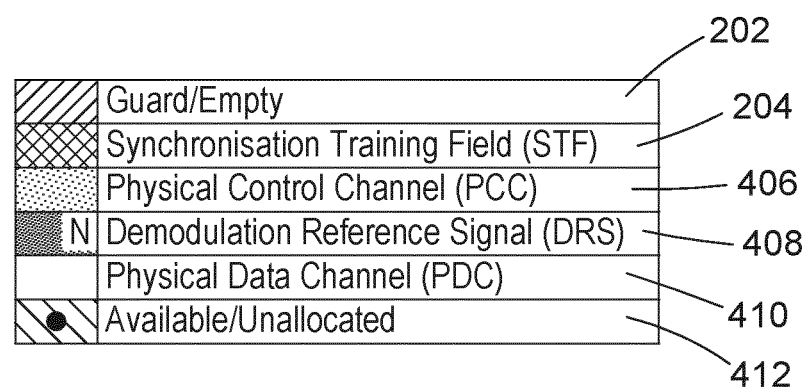
FIG. 4 is a key showing the different subcarrier allocation types shown in FIGS. 5, 8, 9a and 9b.
Figure 5:
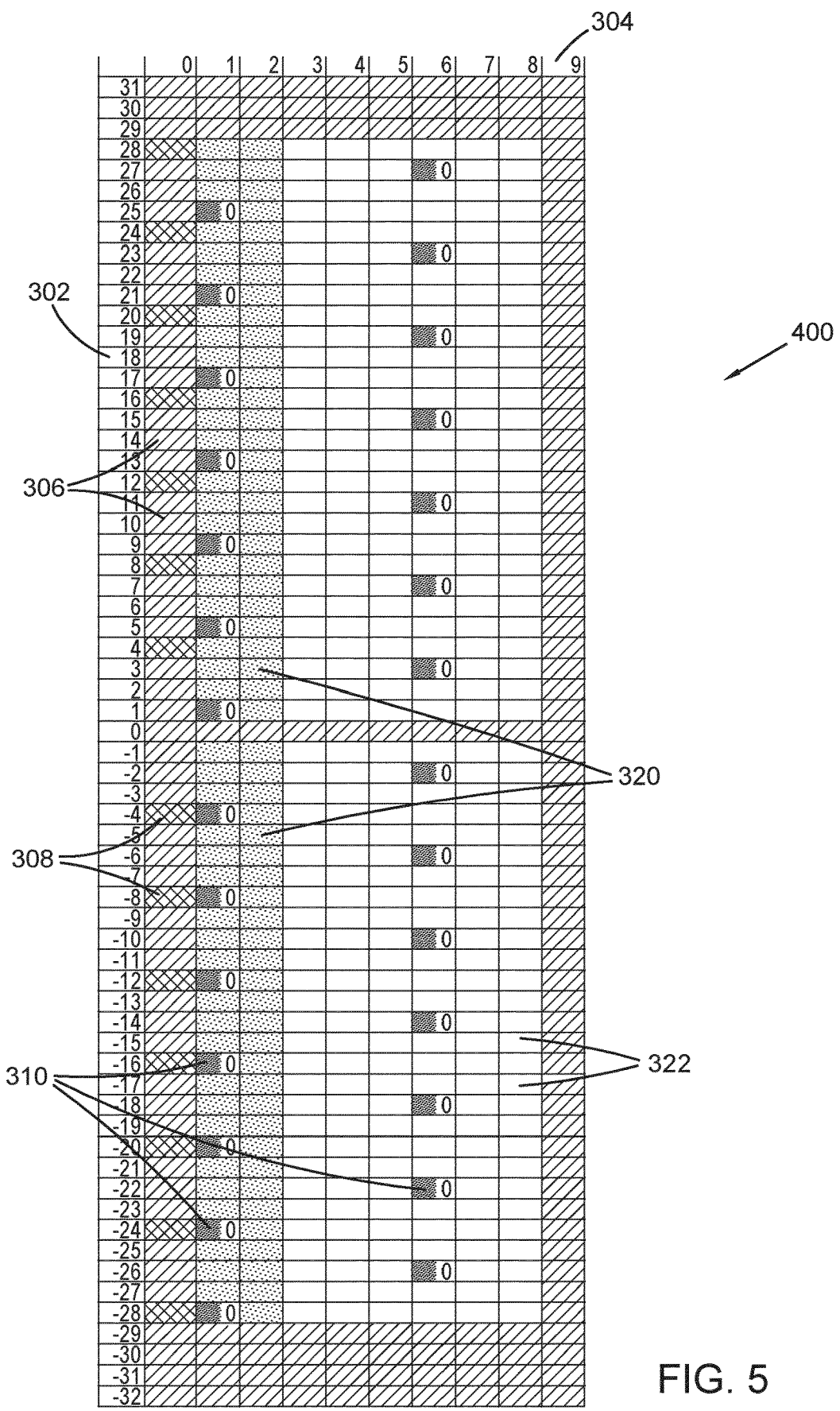
FIG. 5 is a schematic diagram illustrating final subcarrier allocation for transmission of a data packet using a single effective antenna and two subslots.

FIG. 4 is a key showing the different subcarrier allocation types shown in FIGS. 5 and 6, illustrating the different shadings and which subcarrier allocation types they correspond to. Shown are the Guard/Empty field 202, the Synchronisation Training Field (STF) 204, the Physical Control Channel (PCC) 406, the Demodulation Reference Signals (DRS) 408, the Physical Data Channel (PDC) 410 and available/unallocated subcarriers 412. In this example the PCC 406, DRS 408 and PDC 410 make up the Data Field 206 shown in FIG. 3.

The DRS 408 reference signals which allows the receiver 102, 112 to perform channel estimation; the PDC 410 is a data channel comprising the payload of the data packet 200; and the PCC 406 is a control channel comprising various information bits which are required to decode the data channel (PDC 410). FIG. 5 does not contain any available/unallocated subcarriers but FIGS. 8, 9a and 9b do contain available/unallocated subcarriers as these show the progression of subcarrier allocation when performed by transmitter 100, 110.

In order to ensure that the data packet 200 is successfully received by the receiver 102, 112 separate reference signals are provided for each effective transmit antenna used so as to allow the receiver to perform channel estimation for each effective transmit antenna.

FIG. 5 shows an example of subcarrier allocation 400 for the data packet 200 when transmitted by the transmitter 100 with two subslot transmission. The rows correspond to the subcarriers 302 available to the transmitter 100. The number of each subcarrier 302 corresponds to that subcarrier's index, with index 0 corresponding to the central subcarrier frequency. In the example given in FIG. 5 there are sixty four subcarriers 302 available to the transmitter 100—i.e. the transmitted data packet 200 has a Fast Fourier Transform (FFT) of size sixty four. The columns correspond to the time-evolution of symbols 304 transmitted by the transmitter 100. The number of each symbol 304 corresponds to that symbol's index, with index 0 being the first symbol transmitted by the transmitter 100.

Guard allocations 306 correspond to the allocations for guard/empty fields 202. STF allocations 308 correspond to subcarrier allocations for transmitting the Synchronisation Training Field 204. DRS allocations 310 correspond to subcarrier allocations for transmitting the Demodulation Reference Signals 408 for the single space-time stream of index zero. PCC allocations 320 correspond to subcarrier allocations for transmitting the Physical Control Channel 406. PDC allocations 322 correspond to subcarrier allocations for transmitting the Physical Data Channel 408.

Transmission of the STF 204 is completed by the end of symbol index zero, and subsequent symbols are used to transmit the Data Field 206. The DF 206 comprises an initial transmission of the DRS 408 and PCC 406, with each being allocated to different subcarriers. The process by which the PCC subcarriers are allocated, in accordance with the present invention, will be described in further detail below with reference to FIGS. 6a and 6b.

Following transmission of the PCC 406, the transmitter 100 transmits the PDC 410. A second set of DRS allocations 320 are transmitted one subslot after transmission of the first set of DRS allocations 320 so as to allow the receiver to perform up-to-date channel estimation. The subcarriers at the edge of the frequency band: subcarriers −32 to −29 and 29 to 31 are allocated to the GF 202 (i.e. no data is transmitted on these subcarriers) so as to protect adjacent radio channels. The central subcarrier (index 0) is also allocated to the GI 202 due to DC-offset concerns.

Figure 6A:
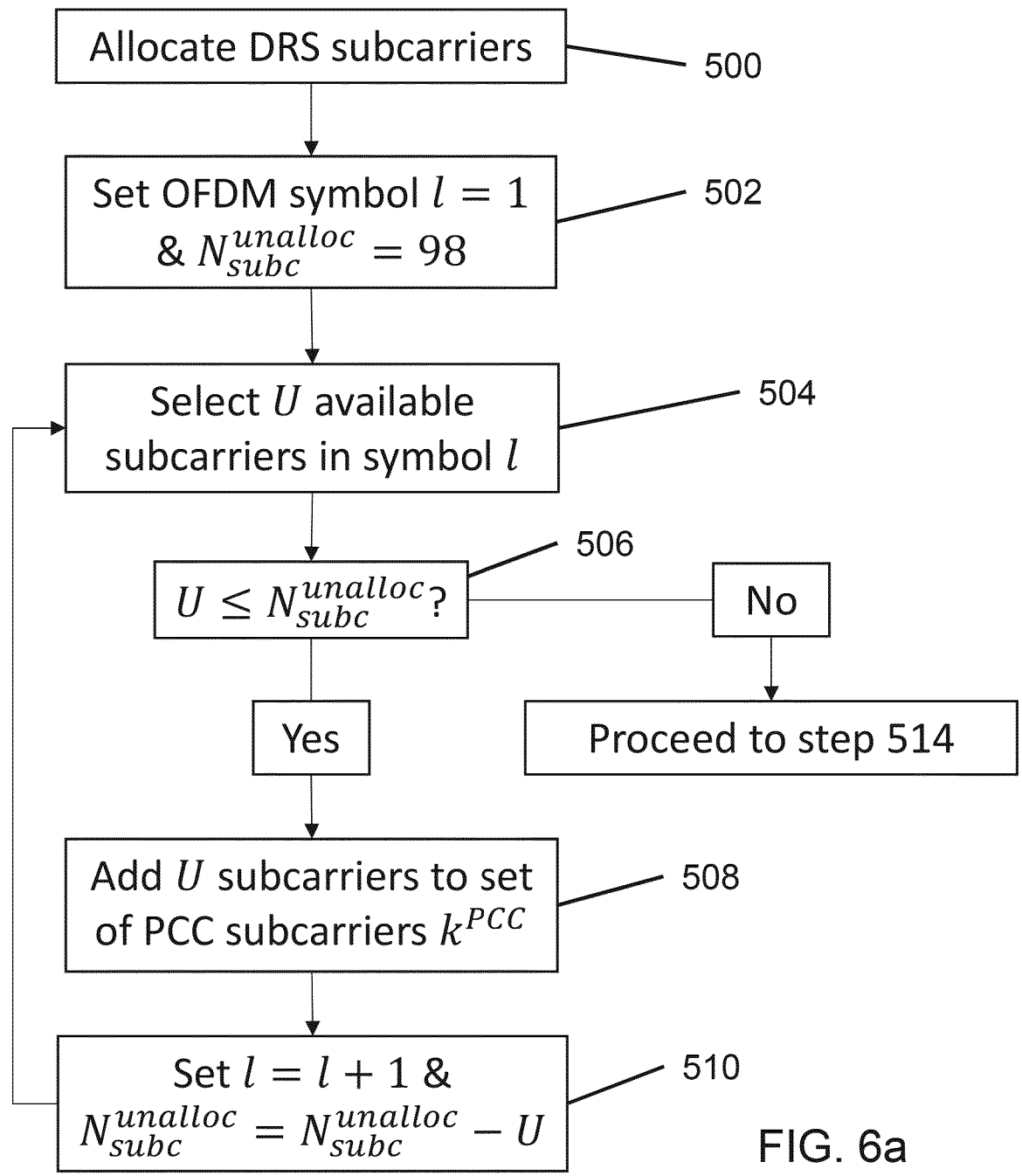
FIGS. 6a and 6b show a flow chart indicating the process by which the transmitter in the radio system allocates subcarriers to the Physical Control Channel (PCC) in accordance with the present invention.

The process by which the transmitter 100, 110 allocates subcarriers to the PCC 406 will now be explained in further detail with reference to FIGS. 6a and 6b. At step 500, as shown in FIG. 6a, the transmitter 100, 110 allocates subcarriers to the DRS 408 according to the number of transmit antennas in use, as specified by the protocol.

The transmitter 100, 110 is required to allocate a set of fourteen DRS allocations 320, spaced evenly along the frequency spectrum of symbol 1, to provide DRS 408 for each effective antenna in use. Thus, if a single effective antenna is in use (i.e. transmitter 100), fourteen subcarriers of symbol 1 will be used for transmitting the DRS 408. If two effective antennas are in use (i.e. transmitter 110), twenty-eight subcarriers of symbol 1 will be used for transmitting the DRS 408.

The transmitter 100, 110 then proceeds to step 502, where it sets the OFDM symbol l=1. As OFDM symbol 0 is used for transmission of the STF 204, symbol 1 is the first available for transmission of the PCC 406. The transmitter 100, 110 also sets the number of unallocated PCC 406 subcarriers $N_{subc}^{unalloc}=98$, as ninety eight subcarriers are required to transmit the PCC 406 as specified in the protocol.

It will be understood that the starting values of 1 and $N_{subc}^{unalloc}$ are not limited to one and ninety eight respectively, but may be any number.

The transmitter 100, 110 then proceeds to step 504, where it selects the available subcarriers in symbol l. The available subcarriers are the subcarriers in symbol l not allocated to the GI 202 nor the DRS 408. The number of available subcarriers in symbol l is equal to U. The U available subcarriers in symbol l are then denoted with the following notation: $k_{(0,l)}, k_{(1,l)} \ldots k_{(U-1,l)}$.

Next, the transmitter 100, 110 proceeds to step 506, where it compares the number of available subcarriers U in symbol l to the number of unallocated PCC 406 subcarriers $N_{subc}^{unalloc}$. If $U<N_{subc}^{unalloc}$, the transmitter 100, 110 proceeds to step 508; if $U \geq N_{subc}^{unalloc}$, the transmitter 100, 110 proceeds to step 512. At step 508, the transmitter 100, 110 adds the set of U available subcarriers $k_{(0,l)}, k_{(1,l)}, \ldots, k_{(U-1,l)}$ in symbol l to the set of subcarriers $k^{PCC}$ allocated to the PCC 408.

The transmitter 100, 110 then proceeds to step 510, where it increments the OFDM symbol l by one—i.e. the transmitter 100, 110 sets l=l+1. The transmitter 100, 110 also decrements the number of unallocated PCC 406 subcarriers $N_{subc}^{unalloc}$ c by U (i.e. the transmitter 100, 110 sets $N_{subc}^{unalloc} = N_{subc}^{unalloc} - U$) as U subcarriers have now been allocated to the PCC 406. The transmitter 100, 110 then proceeds back to step 504, where it again selects the U subcarriers available in the new symbol l.

Figure 6B:
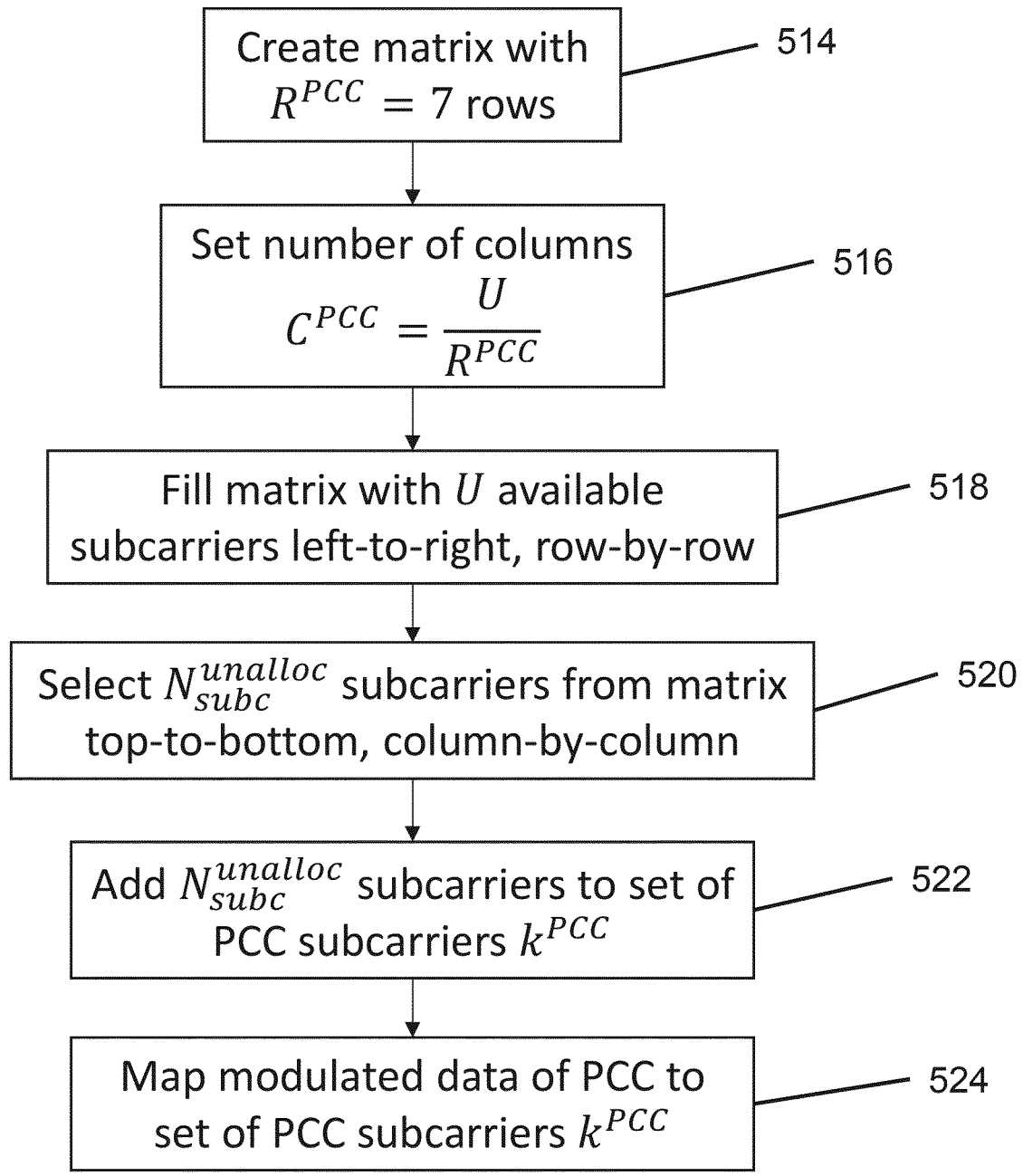

As described above, if $U \geq N_{subc}^{unalloc}$, then the transmitter 100, 110 proceeds to step 514 shown in FIG. 6b. At step 14, the transmitter 100, 110 generates an empty matrix with $R^{PCC}$ rows and sets $R^{PCC}=7$. The reasons for choosing $R^{PCC}=7$ in particular will be described further below with reference to FIGS. 8, 9a and 9b. Next, the transmitter 100, 110 proceeds to step 516, where it sets the number of columns $C^{PCC}$ of the empty matrix to:

$$C^{PCC} = \frac{U}{R^{PCC}}. \quad (1)$$

This value of $C^{PCC}$ is chosen such that the number of elements $N^{matr} = R^{PCC} \cdot C^{PCC}$ in the empty matrix is equal to the number of available subcarriers U in symbol l.

Figure 7A:
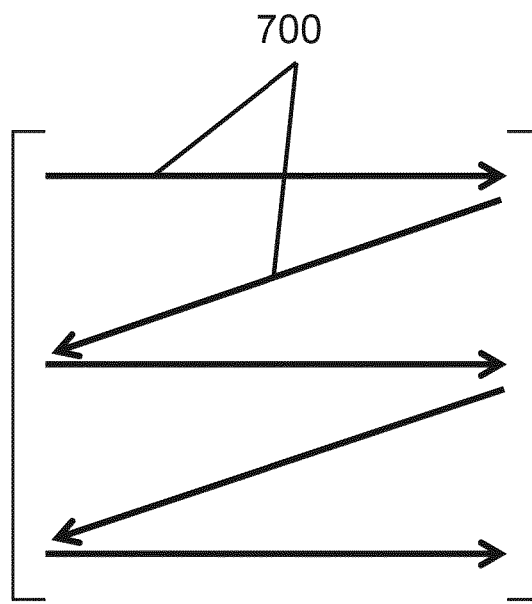
FIG. 7a is a simple visualisation of the process by which the transmitter in the radio system fills an empty matrix with available subcarriers in accordance with the present invention.
Figure 7B:
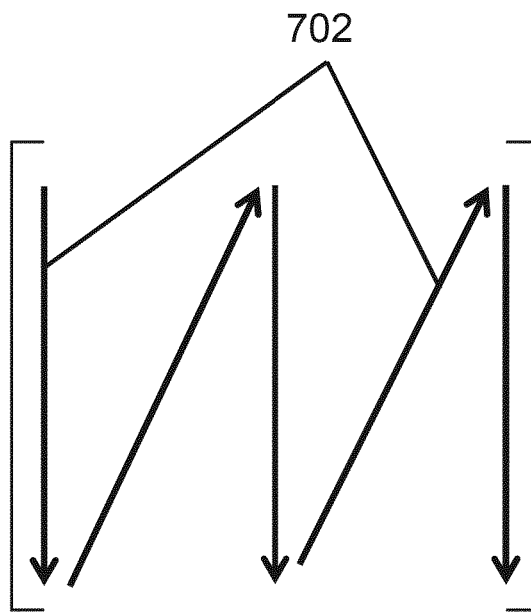
FIG. 7b is a simple visualisation of the process by which the transmitter in the radio system selects which subcarriers to allocate to the PCC in accordance with the present invention.

The transmitter 100, 110 then proceeds to step 518, where it fills the empty matrix with the U available subcarriers $k_{(0,l)}, k_{(1,l)} \ldots k_{(U-1,l)}$, starting from the top-left element of the matrix and moving left-to-right, then down to the next row, filling each row from top-to-bottom as shown in FIG. 7a. This will become clearer with reference to the matrix below, showing the order that the U available subcarriers are input into the matrix. The numbers shown in the matrix below indicate the index i of the available subcarriers $k_{(i,l)}$ in symbol l—i.e. for subcarriers $k_{(0,l)}, k_{(1,l)} \ldots k_{(U-1,l)}$, i=0, 1 ... U–1.

and moving top-to-bottom, moving from column to column left-to-right as shown in FIG. 7b.

The transmitter 100, 110 proceeds to step 522, where it adds the set of $N_{subc}^{unalloc}$ subcarriers selected at step 520 to the set of subcarriers $k^{PCC}$ allocated to the PCC 408. At this point, all 98 required subcarriers have been allocated to the PCC 408.

Finally, at step 524, the transmitter 100, 110 maps the modulated data of the PCC 408 to the set of PCC subcarriers $k^{PCC}$ starting from the lowest OFDM symbol index 1 and the lowest subcarrier index available for that symbol. The transmitter 100, 110 then fills the subcarriers in said OFDM symbol with increasing subcarrier frequency before proceeding to the next OFDM symbol, resulting in the symbol mapping order being independent of allocation order.

FIG. 7a shows a simple visualisation of the process by which the transmitter 100, 110 fills the matrix with the U available subcarriers and FIG. 7b shows a visualisation of the process by which the transmitter 100, 110 selects the remaining $N_{subc}^{unalloc}$ PCC 408 subcarriers from the matrix. The arrows 700 of FIG. 7a show the direction in which the transmitter 100, 110 fills the matrix with the U available subcarriers and the arrows 702 of FIG. 7b show the direction in which the transmitter 100, 110 selects the remaining $N_{subc}^{unalloc}$ PCC 408 subcarriers from the matrix.

It will be understood by those skilled in the art that the transmitter 100, 110 can perform the PCC 406 subcarrier allocation process shown in FIGS. 6a and 6b in real-time. The transmitter 100, 110 may carry out the process before transmission of each data packet; or the transmitter 100, 110 may carry out the process only when the subcarrier allocation changes from one packet to the next (i.e. the number of DRS 408 changes between packets as a result of the transmitter 100, 110 changing operation mode).

The receiver 102, 112 is also required to know the subcarrier allocation used for the PCC 406 by the transmitter 100, 110 in order to be able to decode the data packet 200. It will therefore be understood by those skilled in the art that the receiver 102, 112 will perform a substantially identical process to that shown in FIGS. 6a and 6b so as to ascertain the same subcarrier allocation for the PCC 406 as the transmitter 100, 110 in order to allow successful reception of the data packet 200. Information regarding the MIMO transmission mode (which allows the receiver to deduce the DRS allocation) may be predetermined or conveyed in another way.

Figure 8:
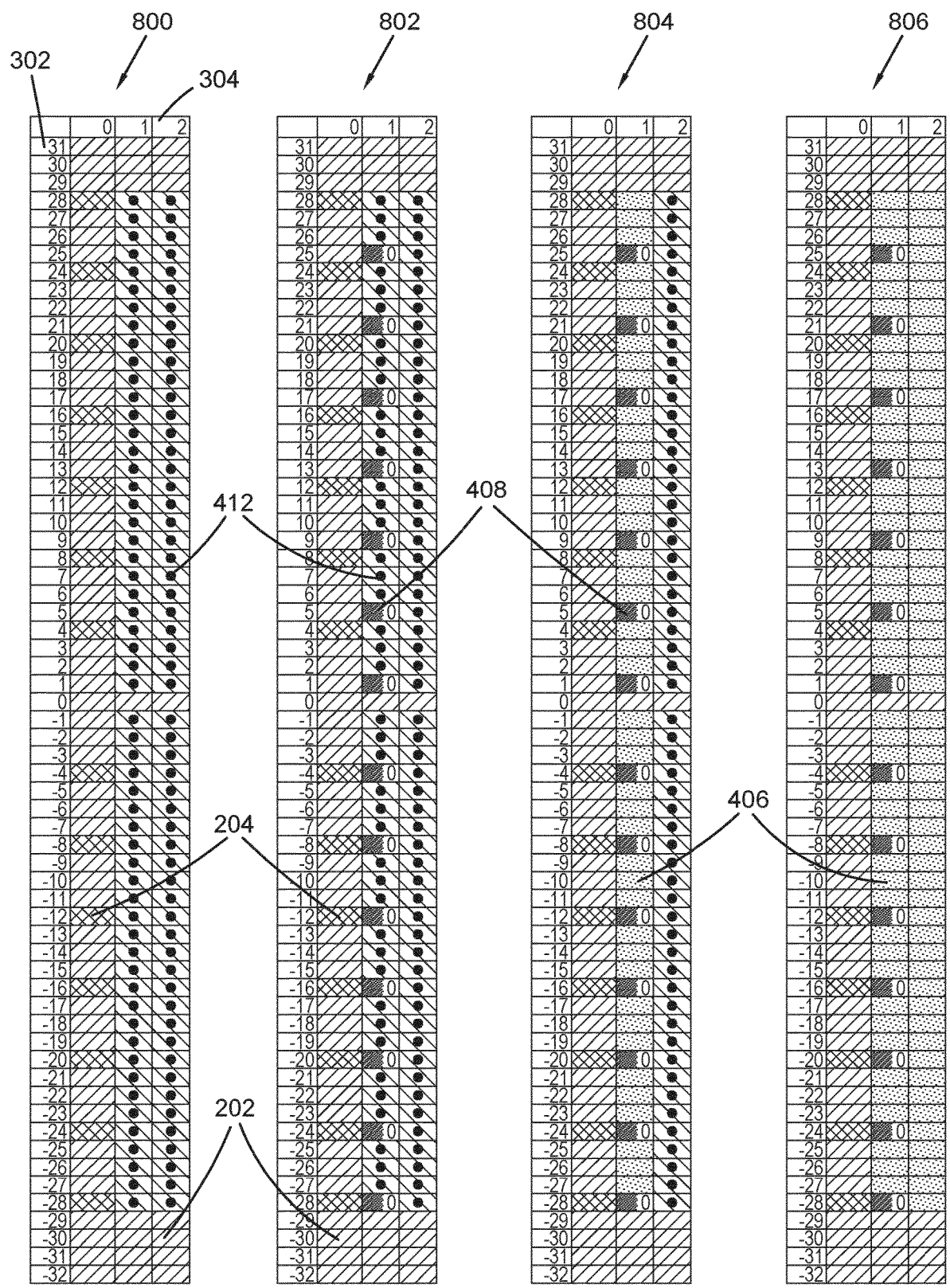
FIG. 8 contains various schematic diagrams illustrating subcarrier allocations as determined by the transmitter 100 at various stages during the PCC subcarrier allocation process.
Figure 9A:
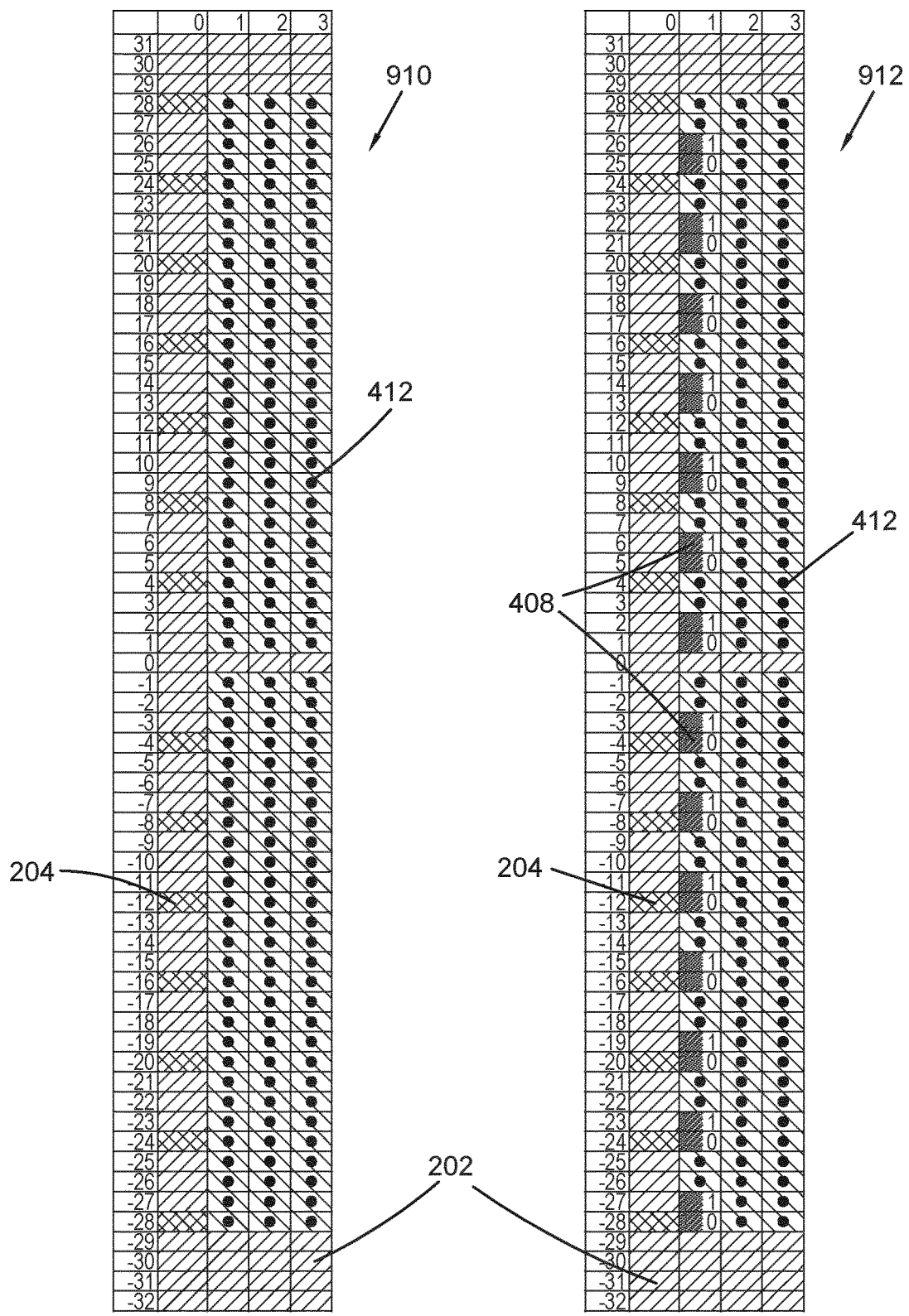
FIGS. 9a and 9b contain various schematic diagrams illustrating subcarrier allocations as determined by the transmitter 110 at various stages during the PCC subcarrier allocation process.
Figure 9B:
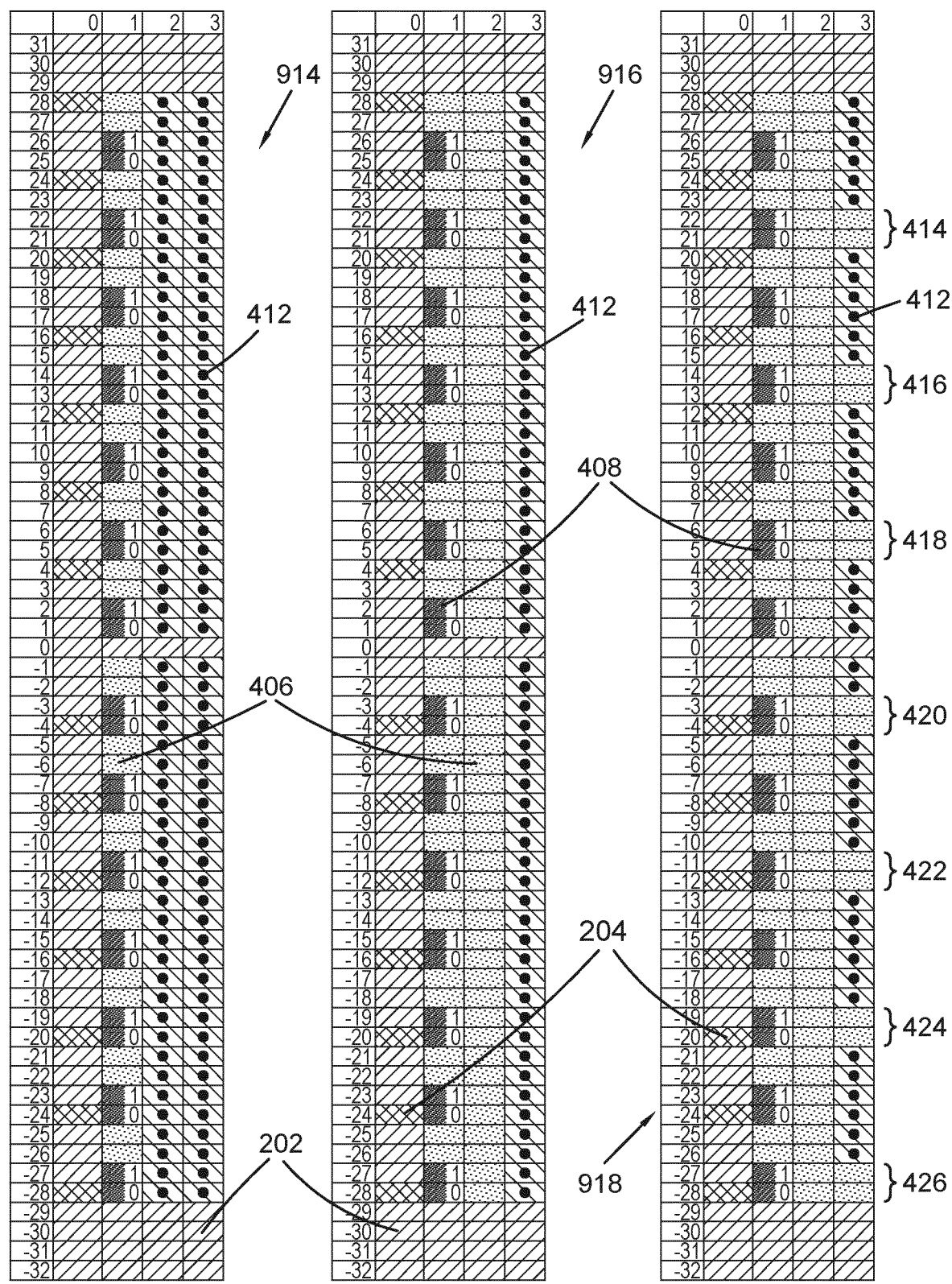

FIGS. 8, 9a and 9b illustrate how the subcarrier allocations referred to above are built up and all use the same subcarrier allocation types as those shown in the key of FIG. 4, which illustrates the different shadings and which subcarrier allocation types they correspond to. Shown in FIG. 4 are the Guard/Empty field 202, the Synchronisation Training Field (STF) 204, the Physical Control Channel (PCC) 406, the Demodulation Reference Signal (DRS) 408, the Physical $$\begin{bmatrix} 0 & 1 & 2 & \ldots & C^{PCC}-1 \\ C^{PCC} & C^{PCC}+1 & C^{PCC}+2 & \ldots & 2C^{PCC}-1 \\ \vdots & \vdots & \vdots & \ddots & \vdots \\ (R^{PCC}-1)C^{PCC} & (R^{PCC}-1)C^{PCC}+1 & (R^{PCC}-1)C^{PCC}+2 & \ldots & U-1 \end{bmatrix} \quad (2)$$

The transmitter 100, 110 then proceeds to step 520, where it selects the remaining $N_{subc}^{unalloc}$ PCC 408 subcarriers from the matrix, starting at the top-left element of the matrix Data Channel (PDC) 410 and available/unallocated subcarriers 412. The same reference numerals are used to refer to the different subcarrier allocation types shown in FIGS. 8, 9a and 9*b*. FIG. 8 shows various subcarrier allocations as determined by the transmitter 100 of FIG. 1 at various stages during the PCC subcarrier allocation process. FIGS. 9*a* and 9*b* contain various subcarrier allocations as determined by the transmitter 110 of FIG. 2 at various stages during the PCC subcarrier allocation process.

In FIG. 8 the subcarrier allocation 800 is what is determined by the transmitter 100 before step 500: the transmitter 100 has allocated subcarriers for transmission of the STF 204 and it has allocated the subcarriers at the edge of the frequency band (indexes −32 to −29 and 29 to 31) as well as the central subcarrier (index 0) to the GF 202 as outlined earlier. As can be seen from allocation 800, this means that there are 56 available/unallocated subcarriers of the 64 total in each of OFDM symbols l=1 and l=2.

Subcarrier allocation 802 is that determined by the transmitter 100 after step 500, where it has allocated the necessary subcarriers to the DRS 408. As there is only one effective antenna, 14 of the 56 available subcarriers in OFDM symbol l=1 are required. This means that there are now U=42 subcarriers in OFDM symbol l=1 available for PCC 406 allocation (not used for the DRS 408). The transmitter 100 then sets the OFDM symbol l=1 and sets $N_{subc}^{unalloc}=98$ at step 502, as described previously.

As $U<N_{subc}^{unalloc}$ (42<98), the transmitter 100 proceeds to the first iteration of step 508 resulting in subcarrier allocation 804: all of the available subcarriers in OFDM symbol l=1 have been allocated by transmitter 100 to the PCC 406.

The transmitter 100 then proceeds to step 510, where it sets l=l+1=2 and $N_{subc}^{unalloc}=N_{subc}^{unalloc}-U=56$. There are U=56 available allocations in OFDM symbol 2.

On the second iteration, as $U \geq N_{subc}^{unalloc}$ (56=56), the transmitter 100 proceeds to step 514, where it creates an empty matrix with $R^{PCC}=7$ rows. The transmitter 100 chooses the value of $R^{PCC}=7$ here as it is a common factor of U=56 and the initial value of $N_{subc}^{unalloc}=98$ that produces even sized groups of subcarriers with adjacent frequencies allocated to the PCC. The transmitter 100 then calculates the number of columns to be:

$$C^{PCC} = \frac{U}{R^{PCC}} = \frac{56}{7} = 8 \qquad (3)$$

at step 516. The transmitter 100 then fills the matrix with the U=56 available subcarriers in OFDM symbol l=2 using the process outlined previously at step 518.

The transmitter 100 then selects $N_{subc}^{unalloc}=56$ subcarriers from the matrix using the process outlined previously at step 520. In this case, $N_{subc}^{unalloc}=U$ and therefore the transmitter 100 selects every subcarrier in the matrix. The transmitter 100 then adds the selected subcarriers to the PCC 406 allocation, giving the final subcarrier allocation 806.

FIGS. 9*a* and 9*b* shows specific examples of the step-by-step PCC 408 subcarrier allocations that arise when the transmitter 110 of FIG. 2 (i.e. a transmitter with two effective antennas) performs the process outlined above with each iteration.

In FIG. 9*a* the subcarrier allocation 810 is that determined by the transmitter 110 before step 500: the transmitter 110 has allocated subcarriers for transmission of the STF 204 and it has allocated the subcarriers at the edge of the frequency band (indexes −32 to −29 and 29 to 31) as well as the central subcarrier (index 0) to the GF 202 as outlined earlier. As can be seen from allocation 810, this means that there are 56 available/unallocated subcarriers of the 64 total in each of OFDM symbols l=1, l=2 and l=3.

Subcarrier allocation 812 is that after step 500, where the transmitter has allocated the necessary subcarriers to the DRS 408. As there are two effective antennas, 28 of the 56 available subcarriers in OFDM symbol l=1 are required. This means that there are now U=28 subcarriers in OFDM symbol l=1 available for PCC 406 allocation (not used for the DRS 408). The transmitter 110 then sets the OFDM symbol l=1 and sets $N_{subc}^{unalloc}=98$ at step 502, as described previously.

As $U<N_{subc}^{unalloc}$ (28<98), the transmitter 110 proceeds to the first iteration of step 508. Subcarrier allocation 814, in FIG. 9*b*, is that determined by the transmitter 110 after the first iteration of step 508: all of the available subcarriers in OFDM symbol l=1 have been allocated by transmitter 110 to the PCC 406.

The transmitter 110 then proceeds to step 510, where it sets l=l+1=2 and $N_{subc}^{unalloc}=N_{subc}^{unalloc}-U=70$. There are U=56 available allocations in OFDM symbol l=2.

On the second iteration, as $U<N_{subc}^{unalloc}$ (56<70), the transmitter 110 proceeds again to step 508. Subcarrier allocation 816, is determined by the transmitter 110 after the second iteration of step 508: all of the available subcarriers in OFDM symbol l=2 have been allocated by transmitter 110 to the PCC 406.

The transmitter 110 the proceeds to step 510, where it sets l=l+1=3 and $N_{subc}^{unalloc}=N_{subc}^{unalloc}-U=14$. There are U=56 available allocations in OFDM symbol l=3.

On the third iteration, as $U \geq N_{subc}^{unalloc}$ (56>14), the transmitter 110 proceeds to step 512 and then 514, where it creates an empty matrix with $R^{PCC}=7$ rows. The transmitter 110 chooses the value of $R^{PCC}=7$ here as it is the a common factor of U=56 and the initial value of $N_{subc}^{unalloc}=98$ that produces even sized groups of subcarriers with adjacent frequencies allocated to the PCC. The transmitter 110 then calculates the number of columns to be:

$$C^{PCC} = \frac{U}{R^{PCC}} = \frac{56}{7} = 8 \qquad (4)$$

at step 516. The transmitter 110 then fills the matrix with the U=56 available subcarriers in OFDM symbol l=3 using the process outlined previously at step 518.

The transmitter 110 then selects $N_{subc}^{unalloc}=14$ subcarriers from the matrix using the process outlined previously at step 520. In this case, as $N_{subc}^{unalloc}=14$, the transmitter 110 selects the seven subcarriers in the first column of the matrix, and the seven subcarriers in the second column of the matrix. The transmitter 110 then adds the selected subcarriers to the PCC 406 allocation, giving the final subcarrier allocation 818. The result of this, as shown in subcarrier allocation 818, is that the PCC 406 is allocated to seven pairs 414, 416, 418, 420, 422, 424 and 426 of available subcarriers in OFDM symbol l=3 with six unallocated subcarriers between each pair. Hence, each group 414, 416, 418, 420, 422, 424 and 426 of subcarriers with adjacent frequencies allocated to the PCC comprises an even number of subcarriers, in this case two, and thus the PCC may be transmitted using transmit diversity using pairs of subcarriers with adjacent frequencies—and therefore similar radio channel responses—as is known in the art.

Thus, it will be seen by those skilled in the art, that by following the PCC 406 subcarrier allocation process in accordance with the present invention, the transmitter 100, 110 allocates subcarriers to the PCC 406 such that the subcarrier frequencies are evenly spread across the whole bandwidth, enabling good gain from frequency selectivity and guarding against narrowband interference.

The invention claimed is:

1. An Orthogonal Frequency-Division Multiplexing digital radio transmitter arranged to transmit a data packet comprising a plurality of Orthogonal Frequency-Division Multiplexing symbols, at least one of said symbols comprising a plurality of demodulation reference signals in a first plurality of frequency sub-carriers of said symbol, the transmitter further being arranged to transmit a physical control channel at least partly distributed among a remainder of frequency sub-carriers of said symbol according to a calculated distribution wherein the transmitter is arranged to calculate said distribution by:
   arranging said remainder of frequency sub-carriers in a two-dimensional matrix such that said remainder of frequency sub-carriers have indices which are sequential in a first dimension and have a common increment in a second dimension; and
   allocating a second plurality of said remainder of frequency sub-carriers to said physical control channel sequentially in said second direction.

2. The Orthogonal Frequency-Division Multiplexing digital radio transmitter as claimed in claim 1 arranged to order the frequency sub-carrier indices in the second direction.

3. The Orthogonal Frequency-Division Multiplexing digital radio transmitter as claimed in claim 1 arranged to determine a total number of frequency sub-carriers required to transmit said physical control channel, calculate a first number of remainder frequency sub-carriers in a first symbol, compare said total number to said first number and carry out said calculation of the distribution only if said total number is less than said first number.

4. The Orthogonal Frequency-Division Multiplexing digital radio transmitter as claimed in claim 3 wherein if the transmitter determines that said total number is greater than or equal to said first number, the transmitter is arranged to allocate all of said first remainder frequency sub-carriers to the physical control channel, subtract said first number from said total number to produce an outstanding number of frequency sub-carriers required to transmit said physical control channel and compare said outstanding number to a second number of remainder frequency sub-carriers in a second symbol.

5. The Orthogonal Frequency-Division Multiplexing digital radio transmitter as claimed in claim 1 wherein a size of the matrix in the second dimension is equal to a common factor of a maximum number of frequency subcarriers which are available in a single Orthogonal Frequency-Division Multiplexing symbol and a number of individual frequency subcarriers required for the physical control channel, such that each group of subcarriers with adjacent frequencies allocated to the physical control channel comprises an even number of subcarriers.

6. The Orthogonal Frequency-Division Multiplexing digital radio transmitter as claimed in claim 1 wherein a size of the matrix in the second dimension is equal to an even division of a highest common factor of a maximum number of frequency subcarriers which are available in a single Orthogonal Frequency-Division Multiplexing symbol and a number of individual frequency subcarriers required for the physical control channel.

7. The Orthogonal Frequency-Division Multiplexing digital radio transmitter as claimed in claim 1 wherein a size of the matrix in the second dimension is equal to seven.

8. The Orthogonal Frequency-Division Multiplexing digital radio transmitter as claimed in claim 1 further arranged to transmit a physical data channel distributed among a remainder of subcarriers not allocated to the demodulation reference signals or to the physical control channel, wherein the physical control channel comprises information required to decode the physical data channel.

9. The Orthogonal Frequency-Division Multiplexing digital radio transmitter as claimed in claim 1 arranged to transmit the data packet using a plurality of effective antennas and to transmit a plurality of sets of demodulation reference signals, wherein one of said sets of demodulation reference signals is transmitted for each respective effective antenna in use by the transmitter.

10. The Orthogonal Frequency-Division Multiplexing digital radio transmitter as claimed in claim 1 arranged to transmit a synchronisation training field distributed among a plurality of subcarriers in at least one Orthogonal Frequency-Division Multiplexing symbol preceding the symbol comprising the plurality of frequency subcarriers allocated to the demodulation reference signals.

11. An Orthogonal Frequency-Division Multiplexing digital radio receiver arranged to receive a data packet comprising a plurality of Orthogonal Frequency-Division Multiplexing symbols, at least one of said symbols comprising a plurality of demodulation reference signals in a first plurality of frequency sub-carriers of said symbol, the receiver further being arranged to decode a physical control channel (PCC) at least partly distributed among a remainder of frequency sub-carriers of said symbol according to a calculated distribution wherein the receiver is arranged to calculate said distribution by:
   arranging said remainder of frequency sub-carriers in a two-dimensional matrix such that said remainder of frequency sub-carriers have indices which are sequential in a first dimension and have a common increment in a second dimension; and
   allocating a second plurality of said remainder of frequency sub-carriers to said PCC sequentially in said second direction.

12. A method of allocating a physical control channel (PCC) to frequency sub-carriers of an Orthogonal Frequency-Division Multiplexing symbol in an Orthogonal Frequency-Division Multiplexing digital radio transmission system, the method comprising:
   determining a first plurality of said frequency sub-carriers allocated to demodulation reference signals;
   determining a remainder of said frequency sub-carriers of said symbol by:
   arranging said remainder of frequency sub-carriers in a two-dimensional matrix such that said remainder of frequency sub-carriers have indices which are sequential in a first dimension and have a common increment in a second dimension;
   allocating a second plurality of said remainder of frequency sub-carriers to said PCC sequentially in said second direction; and
   recording said allocation of frequency sub-carriers to said PCC.

* * * * *